(12) United States Patent
Claus et al.

(10) Patent No.: US 6,588,669 B1
(45) Date of Patent: Jul. 8, 2003

(54) OPTOELECTRONIC DEVICE

(75) Inventors: Armin Claus, Nürtingen (DE); Rolf Gseller, Kirchheim/Teck (DE)

(73) Assignee: Leuze Electronic GmbH & Co., Owen/Teck (DE)

( * ) Notice: Subject to any disclaimer, the term of this patent is extended or adjusted under 35 U.S.C. 154(b) by 106 days.

(21) Appl. No.: 09/639,275

(22) Filed: Aug. 15, 2000

(30) Foreign Application Priority Data

Apr. 11, 2000 (DE) ......................................... 100 17 862

(51) Int. Cl.[7] ................................................. G06K 7/10
(52) U.S. Cl. .................... 235/462.4; 235/383; 235/454; 235/462.36; 235/462.39
(58) Field of Search ................................. 235/383, 454, 235/462.14, 462.36, 462.39, 462.4

(56) References Cited

U.S. PATENT DOCUMENTS

| | | | |
|---|---|---|---|
| 5,019,714 A | | 5/1991 | Knowles |
| 5,231,277 A | | 7/1993 | Aritake et al. |
| 5,497,314 A | * | 3/1996 | Novak ......................... 235/383 |
| 5,637,852 A | * | 6/1997 | Knowles et al. ........ 235/462.14 |
| 5,637,854 A | * | 6/1997 | Thomas ....................... 235/454 |
| 5,679,941 A | * | 10/1997 | Iizaka et al. ................. 235/383 |
| 5,975,418 A | | 11/1999 | Ishii et al. |
| 6,330,973 B1 | * | 12/2001 | Bridgelall et al. ..... 235/462.01 |
| 6,360,947 B1 | * | 3/2002 | Knowles et al. ........ 235/462.01 |

FOREIGN PATENT DOCUMENTS

EP 0 479 622 A 4/1992

* cited by examiner

*Primary Examiner*—Michael G. Lee
*Assistant Examiner*—Steven S. Paik
(74) *Attorney, Agent, or Firm*—Venable LLP; Robert Kinberg; Catherine M. Voorhees

(57) ABSTRACT

The invention relates to an optoelectronic device (1) for detecting markings affixed to objects by using a transmitter (6) that emits light rays (8), a receiver (11) that receives light rays (10), an evaluation unit (5) and a deflection unit (9) at which the transmitting light rays (8) are reflected and, as a result, are periodically guided inside a predetermined angular range. At least two stationary reflecting units are installed in series after the deflection unit (9). The transmitting light rays (8) are guided over the first reflecting unit inside a first segment $\Delta\alpha_1$ of the angular range $\Delta\alpha$, so that these rays periodically scan a first segment of a three-dimensional detection range. Inside of a second segment $\Delta\alpha_2$ of the angular range $\Delta\alpha$, the transmitting light rays (8) are guided over a second reflecting unit, so that these rays periodically scan a second segment of the three-dimensional monitoring range. The object can be introduced into the detection range for detecting the markings on the object.

14 Claims, 4 Drawing Sheets

OPTOELECTRONIC DEVICE

BACKGROUND OF THE INVENTION

The invention relates to an optoelectronic device for detecting markings affixed to objects by using a transmitter that emits light rays, a receiver that receives light rays, an evaluation device and a deflection unit.

Devices of this type in particular can be designed as barcode readers. These barcode readers can detect, for example, barcodes affixed to the top surfaces of objects transported along on a conveyor belt, such as packages or the like. For detecting the barcodes on the top surfaces of the objects, the barcode reader is thus installed above the conveyor belt and above the objects.

However, problems can arise in cases where the orientation of barcodes affixed to objects is not clearly given, relative to the barcode reader.

Objects of this type are, for example, sample tubes used in medical technology, which are moved along the conveyor belt while standing in an upright position.

The sample tubes contain blood samples, urine samples, serum samples or the like, which are marked with a barcode on the surface area of the sample tube.

An optoelectronic device designed as barcode reader is used to detect the barcodes and identify the samples, which device is installed stationary on the side of the conveyor belt.

The disadvantage of this configuration is that the barcode reader can detect the barcodes on a sample only if the barcode reader is directed toward this barcode. Detection is not possible, however, if the barcode is on the side facing away from the barcode reader.

To avoid a faulty detection, the sample tube could respectively be turned so that the barcode is located on the side of the sample tube that is facing the barcode reader.

However, turning the sample tube in this way would require an undesirably high manual expenditure and a correspondingly high use of personnel.

A device for automatically turning the sample tubes would require an additional sensor-controlled device, thereby resulting in considerable cost expenditure.

SUMMARY OF THE INVENTION

It is the object of the invention to design a device of the aforementioned type in such a way that it can detect markings with certainty in a different spatial orientation to the device.

This object is solved with an optoelectronic device according to the invention comprising a deflection unit, which is followed by at least two reflecting units. By way of the deflection unit, the transmitting light rays are periodically guided inside a predetermined angular range $\Delta\alpha$. Inside a first segment $\Delta\alpha_1$ of the angular range $\Delta\alpha$, the transmitting light rays are guided over the first reflecting unit, so that these rays periodically scan a first section of a three-dimensional detection range. Inside a second segment $\Delta\alpha_2$ of the angular range $\Delta\alpha$, the transmitting light rays are guided over the second reflecting unit, so that these rays periodically scan a second section of the detection range.

The object with the marking arranged thereon is preferably introduced to the detection range by means of a conveyor.

The transmitting light rays are guided via the reflecting units and at differing angles of incidence onto the object surface, so that markings with differing orientation on the object surface can be detected with certainty.

Since the detection range is a three-dimensional area, the markings can also be arranged on an object surface extending in a three-dimensional space and can still be detected with certainty.

In particular, the objects can be sample tubes transported along on a conveyor belt that serves as conveying device. For this, the sample tubes are preferably positioned such that they stand upright on the conveyor belt, wherein the barcodes can be affixed at optional angular positions on the surface area of the sample tubes. The longitudinal axes of the barcodes preferably extend in longitudinal direction of the sample tubes. Since the transmitting light rays are guided at different angles of incidence over the surface area of the complete circumference of the sample tubes and preferably scan this surface area in longitudinal direction, the barcode can be detected with certainty at optional angular positions, without requiring a realignment of the sample tubes.

BRIEF DESCRIPTION OF THE DRAWINGS

The invention is explained in the following with the aid of drawings wherein.

DETAILED DESCRIPTION OF THE INVENTION

Figure 1:
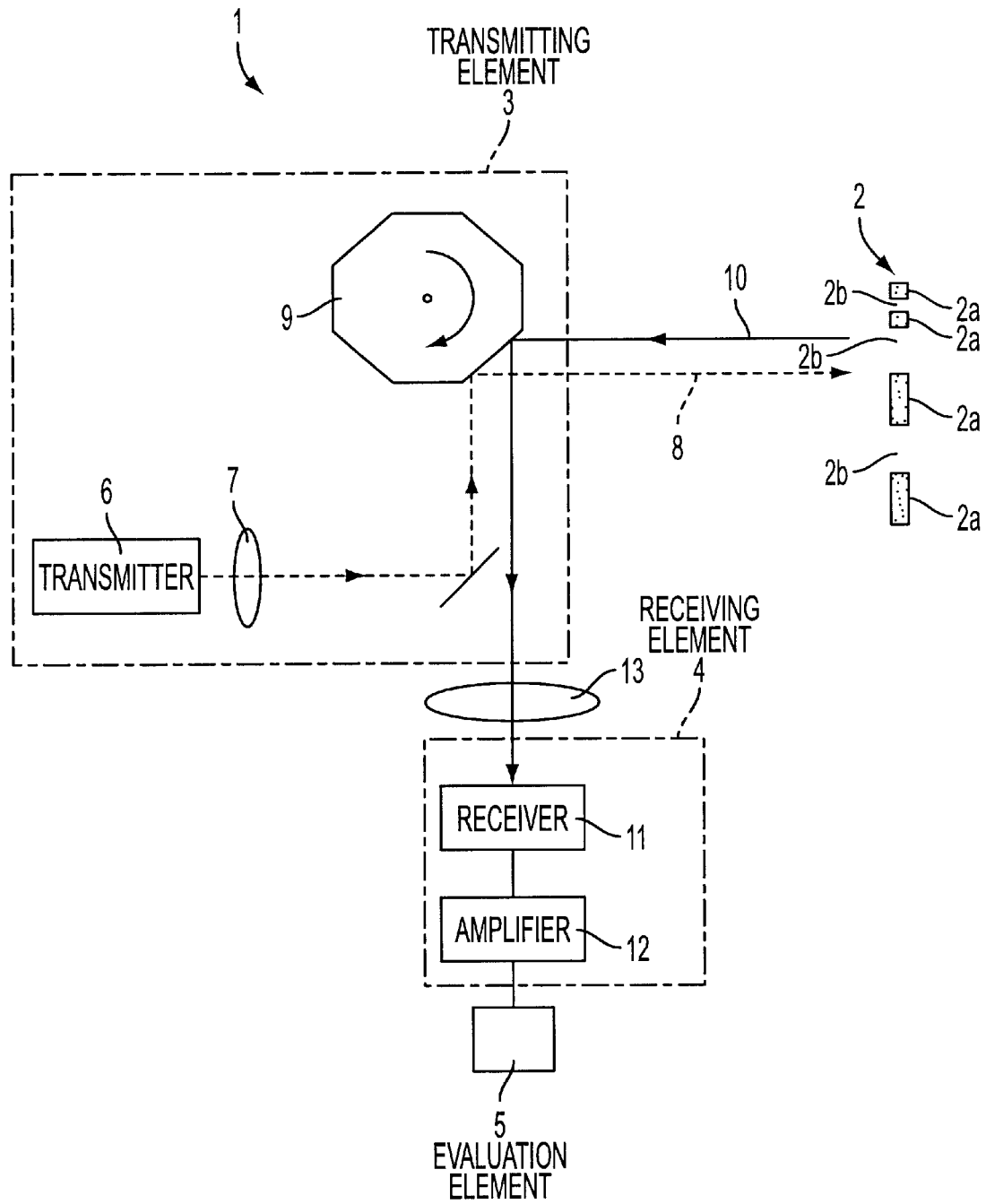
FIG. 1 is a schematic design of an optoelectronic device configured as barcode reader.

FIG. 1 shows the basic design of an optoelectronic device 1 that is designed as a barcode reader and is used for detecting markings provided with defined contrast patterns. In principle, these markings can have optional sequences and shapes for adjoining light areas and dark areas, preferably black-and-white areas. For the present exemplary embodiment, the markings are formed by barcodes 2. The barcodes 2 essentially consist of a sequence of black and white line elements 2a, 2b with a defined length and width.

Figure 2:
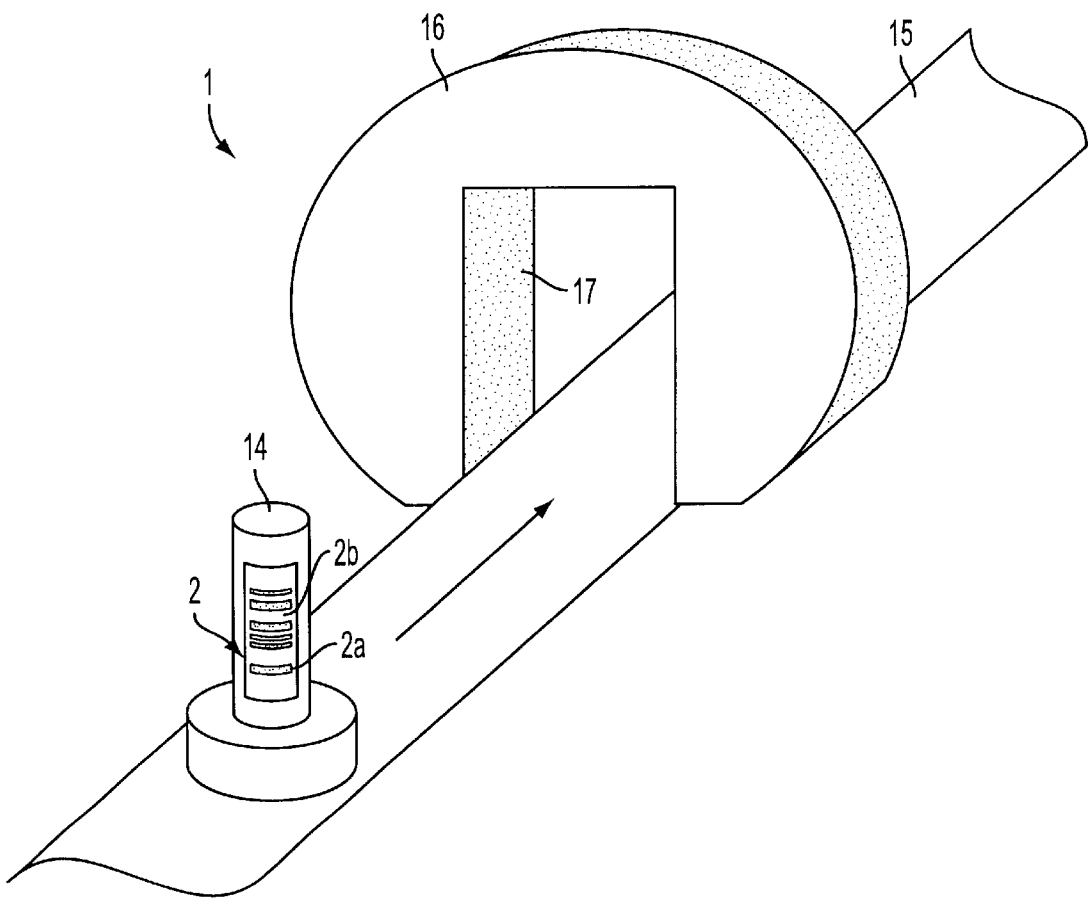
FIG. 2 is an arrangement of the optoelectronic device according to the invention for detecting markings on objects conveyed on a conveyor.

The optoelectronic device 1 consists essentially of a transmitting element 3, a receiving element 4, as well as an evaluation element 5. The transmitting element 3 consists of a transmitter 6, preferably a laser diode, as well as a transmitting optic 7 that is installed in front of the transmitter 6 and is used to focus the transmitting light rays 8. The focused transmitting light rays 8 are deflected via the deflection unit 9, which is a rotating polygonal mirror wheel for the exemplary embodiment at hand, and are guided across the barcode 2 to be detected. The rotational axis of the polygonal mirror wheel is arranged perpendicular to the equatorial plane of the polygonal mirror wheel, which plane is shown in FIG. 2. As a result of the rotational movement of the polygonal mirror wheel, the transmitting light rays 8 are guided periodically inside a predetermined angular range, inside the equatorial plane that forms the scanning plane. In the process, barcodes 2 can be read within a specified distance range, depending on the focusing of the transmitting light rays 8. This distance range forms the reading range for the barcode reader.

The receiving light rays 10 that are reflected by the barcode 2 are guided over the polygonal mirror wheel to the receiving element 4. The receiving element 4 consists of a receiver 11 in the form of a photodiode, inside of which the receiving light rays 10 are converted to an electric receiving signal. An amplifier 12 is installed in series after the receiver 11. A receiving optic 13 is installed in front of the receiving element 4 in order to improve the detection sensitivity.

The receiving signal that is present at the output of the receiving element 4 is transmitted to the evaluation unit 5. There, the receiving signal is evaluated with at least one threshold value to reconstruct the contrast pattern of barcode 2.

With the barcode reader according to FIG. 1, the transmitting light rays 8 are guided over a scanning plane, so that the markings can be detected only within a limited reading range inside the scanning plane.

Figure 3:
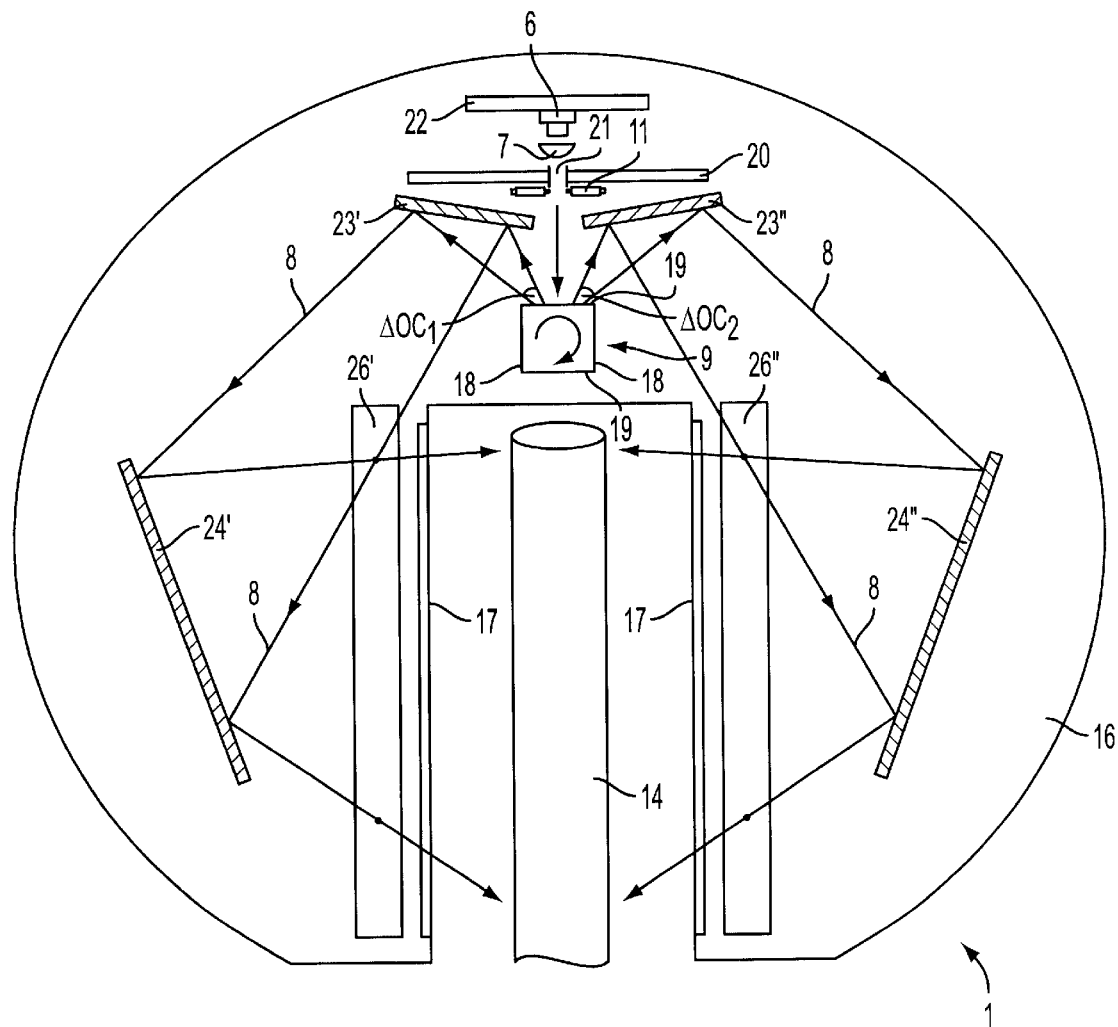
FIG. 3 is a longitudinal section through the optoelectronic device according to FIG. 2.
Figure 4:
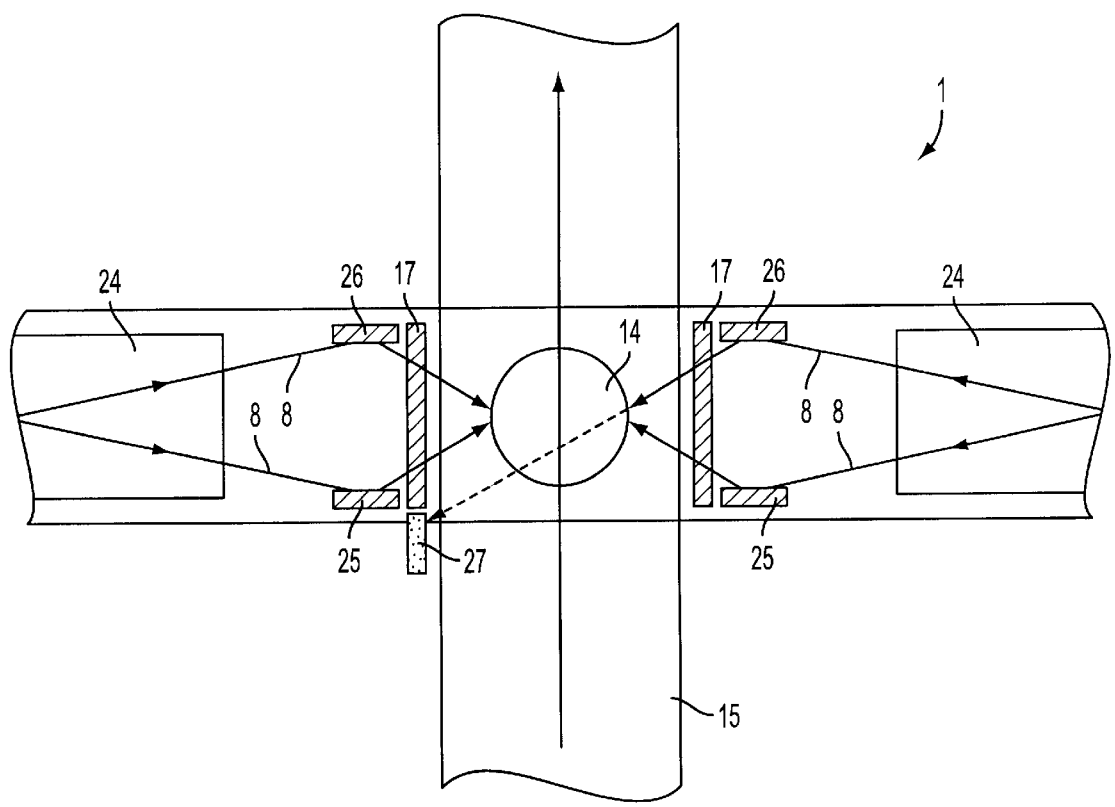
FIG. 4 is a cross section through the optoelectronic device according to FIG. 2.

The optoelectronic devices at shown in FIGS. 2–4, makes it possible to detect markings in a three-dimensional detection range, so that markings with a different spatial orientation to the optoelectronic device 1 can be detected with certainty.

For the present exemplary embodiment, the objects are sample tubes 14 containing samples of blood, urine, serum or the like. A barcode 2 is affixed to the surface areas of the sample tubes 14 for identifying the samples, wherein the barcode line elements 2a, 2b are arranged sequentially in longitudinal direction of the sample tubes 14, as shown in FIG. 2. The line elements extend over a specified angular range in circumferential direction of the surface area of the sample tube 14. Also, additional markings can be provided on the sample tubes 14.

The sample tubes 14 are transported on a conveying device, for example on a conveyor belt 15. For this, the sample tubes 14 are positioned inside holders, so that they are transported while standing upright.

According to the invention, the optoelectronic device 1 detects the markings and preferably also the additional identifications while the sample tubes 14 are transported along. The barcodes 2 and if necessary the additional identifications can be arranged for this at optional angular positions on the surface area of the sample tubes 14.

FIG. 2 in particular shows that the optoelectronic device 1 is integrated into an arched housing 16. The housing 16 has two side legs that are arranged on opposite sides of conveyor belt 15. The side legs and the adjacent ceiling of housing 16 delimit an intermediate space to which the sample tubes on the conveyor 15 are transported. This intermediate space essentially corresponds to the detection range, inside of which the markings can be detected on the sample tube 14. The intermediate space has an essentially square cross section, and its height is adapted to the height of the sample tubes 14. The width of the intermediate space essentially corresponds to the width of conveyor belt 15. In longitudinal direction of conveyor belt 15, the housing 16 extends farther than the diameter of the sample tubes 14.

For detecting a marking on a sample tube 14, the sample tube 14 is preferably located in the center of this intermediate space, as shown in FIGS. 3 and 4.

The guidance of transmitting lights rays 8 in this case is selected such that these rays pass through exit windows 17 on the insides of the side legs of the arch and strike the surface area of sample tube 14 at different angles of incidence. Thus, a barcode 2, affixed at an optional angular position to the sample tube 14 can be detected with certainty.

For this, the optoelectronic device 1 is provided with two reflecting units that have reflection mirrors installed in series after the deflection unit 9, wherein transmitting light rays 8 are transmitted from a first side via the first reflecting unit through the first exit window 17 onto the sample tube 14. Transmitting light rays 8 are also transmitted from a second side via the second reflecting unit through the second exit window 17 onto the sample tube 14.

The individual optical components of the optoelectronic device 1 in this case have a mirror-symmetrical design relative to the vertically extending symmetry plane for housing 16.

The deflection unit 9 is arranged above the intermediate space, in the ceiling area of housing 16, and is designed as a polygonal mirror wheel with four facets 18, 19 that form mirror surfaces. The rotational axis of the polygonal mirror wheel is positioned in the symmetry plane of housing 16 and extends in horizontal direction.

A first plate 20 with a central bore 21 and the receiver 11 is provided above the polygonal mirror wheel. The receiver 11 is formed, for example, by two photodiodes that are arranged on both sides of the bore 21.

A second plate 22 with the transmitter 6 is installed above the first plate 20. The transmitting light rays 8 that are emitted by the transmitter 6 pass through the bore 21 in the first plate 20 and subsequently strike a facet 18 or 19 of the polygonal mirror wheel. The receiving light rays 10 that are reflected at the polygonal mirror wheel strike the receiver 11.

Each reflecting unit has a first reflecting mirror 23 (23' or 23") with an essentially horizontally extending mirror surface, which is arranged between the polygonal mirror wheel and the first plate 20.

A second reflecting mirror 24 (24' or 24") with slanted mirror surface is installed in series behind the first reflecting mirror 23. The normal vectors of both reflecting mirrors 23, 24 extend on one plane, perpendicular to the rotational axis.

A third reflecting mirror 25 and a forth reflecting mirror 26 (26' or 26") are installed in series behind the second reflecting mirror 24. These reflecting mirrors 25, 26 are arranged at a distance to each other and symmetrical to the symmetry plane of the second reflecting mirror 24, which plane extends perpendicular to the longitudinal axis of conveyor belt 15. The mirror surfaces of the third and fourth reflecting mirrors 25, 26 in this case extend parallel to each other and also perpendicular to the longitudinal axis of conveyor belt 15.

The third and fourth reflecting mirrors 25, 26 are located directly behind the exit window 17, wherein respectively one reflecting mirror 25 or 26 adjoins the side edge of the exit window 17.

The height for each of these reflecting mirrors 25, 26 corresponds to the height of the exit window 17, wherein its height is adapted to the dimensions of the sample tube 14.

The width of exit window 17 essentially corresponds to the width of the second reflecting mirror 24.

The two reflecting units therefore respectively consist of four reflecting mirrors 23, 24, 25, 26, wherein the reflecting units are arranged symmetrical to the symmetry axis of housing 16, in which the rotational axis of the polygonal mirror wheel extends.

As a result of the rotational movement of the polygonal mirror wheel, the transmitting light rays 8 that are reflected at the polygonal mirror wheel sweep across a specified angular range $\Delta\alpha$. The dimensions for this angular range are essentially predetermined by the number of facets 18, 19 of the polygonal mirror wheel.

FIG. 3 in particular shows that inside a first segment $\Delta\alpha_1$ of this angular range $\Delta\alpha$, the transmitting light rays 8 are guided over the reflecting mirrors 23', 24', 25', 26' of the first reflecting unit. Accordingly, the transmitting light rays 8 are then also guided through the exit window 17, which follows these reflecting mirrors 23', 24', 25', 26', so that the transmitting light rays 8 arrive from a first side at the sample tube 14.

Inside a second segment $\Delta\alpha_2$ of angular range $\Delta\alpha$, the transmitting light rays 8 are guided over the reflecting mirrors 23'', 24'', 25'', 26'' of the second reflecting unit. Accordingly, the transmitting light rays 8 are then guided from a second side through the second exit window 17 and onto the sample tube 14.

As a result of the rotational movement of the polygonal mirror wheel, the transmitting light rays 8 are guided alternatively over the first and the second reflecting unit, wherein the sample tube 14 is scanned alternatively at opposite sides of the detection range.

The polygonal mirror wheel comprises four facets 18, 19 with level mirror surfaces, on which the transmitting light rays 8 are reflected.

In the event that the normal vectors of the mirror surfaces extend respectively perpendicular to the rotational axis of the polygonal mirror wheel, the transmitting light rays 8 respectively strike the mirror surfaces of the facets 18, 19 at a right angle, so that they are guided over the centers of the first and second reflecting mirrors 23, 24. The transmitting light rays 8 are then deflected at the second reflecting mirror 24, such that they are guided between the third and fourth reflecting mirror 25, 26, that they pass through the center of exit window 17 and then strike the sample tube 14 from a predetermined direction.

In the process, the transmitting light rays 8 are guided inside of the segments a $\Delta\alpha_1$ or $\Delta\alpha_2$ over the two reflecting mirrors 23', 24'; 23'', 24''. As a result of the rotational movement of the polygonal mirror wheel and the subsequent reflections at the first and second reflecting mirrors 23', 24'; 23'', 24'' the transmitting light rays 8 are then guided in vertical direction along the surface area of sample tube 14.

With the optoelectronic device 1 according to the invention, the polygonal mirror wheel comprises an alternating arrangement of two facets 18, 19 with a different inclination relative to the rotational axis of the polygonal mirror wheel. The inclinations of the two different facets 18, 19 in that case are usefully designed to be symmetrical to the equatorial plane of the polygonal mirror wheel. As a result, the transmitting light rays 8, which are reflected at differently inclined facets 18, 19, extend at a predetermined screening angle relative to each other.

Accordingly, the transmitting light rays 8 that are reflected at the first facets 18 are guided over the first and second reflecting mirrors 23, 24 to the third reflecting mirror 25. In contrast, the transmitting light rays 8 reflected at the second facets 19 are guided via the first and second reflecting mirrors 23, 24 to the fourth reflecting mirror 26.

The transmitting light rays 8 that are reflected at the third and fourth reflecting mirrors 25, 26 arrive at the sample tube 14, approximately at a right angle to each other.

As a result of this design for deflection unit 9 and the subsequent installed reflecting units, the transmitting light rays 8 are guided from four different incidence directions onto the sample tube 14. In the process, transmitting light rays 8 scan the sample tube 14 in vertical direction for each incidence direction. The barcode 2 has a relatively wide width, so that it extends over an angular range of at least 90° in circumferential direction of the sample tube 14. The barcode 2 therefore can be detected with certainty using the optoelectronic device 1 according to the invention, regardless of its orientation in the detection range.

FIG. 3 shows that a test barcode 27 is provided in the edge region of an exit window 17.

In that case, the test barcode 27 at exit window 17 is arranged such that it is scanned by the transmitting light rays 8 that are guided over the opposite-arranged reflecting unit.

As a result, the transmitting light rays 8 that are guided over this reflecting unit are guided through the opposite-arranged exit window 17 and the detection range to the test barcode 27 and are reflected back from there in the same direction.

The test barcode 27 therefore can be detected only if no object is located in the detection range.

The non-detection of the test barcode 27 thus indicates the existence of an object in the detection range. With the aid of this signal, for example, the evaluation device for detecting the barcode 2 can be activated. Additional sensors for detecting the presence of an object are therefore not necessary.

What is claimed is:

1. An optoelectronic device for detecting markings affixed to objects comprising:

an arch-type housing with inner side legs and an inner, upper edge forming an opening;

a three-dimensional detection range through which an object affixed with a marking is introduced in order to detect the marking, said arch-type housing enclosing the detection range;

a transmitter that emits light rays;

a single deflection unit which reflects the transmitted light rays, the transmitted light rays being periodically guided within a specified angular range;

at least two reflecting units including first and second stationary reflecting units installed to receive transmitted light rays from said deflection unit, wherein a first portion of the transmitted light rays is guided over the first reflecting unit inside a first segment $\Delta\alpha_1$ of the specified angular range $\Delta\alpha$ thereby periodically scanning a first segment of the three-dimensional detection range, and a second portion of the transmitted light rays is guided over the second reflecting unit within a second segment $\Delta\alpha_2$ of the specified angular range $\Delta\alpha$ thereby periodically scanning a second segment of the three-dimensional detection range;

a receiver that receives scanned light rays;

an evaluating device that determines with certainty markings affixed on objects, wherein oppositely-arranged surfaces of an object affixed with a marking and moved through the detection range are scanned with the transmitted light rays guided over the first reflecting unit and the transmitted light rays guided over the second reflecting unit, respectively; and a conveying device wherein the objects are introduced into the detection range by means of the conveying device with a longitudinal axis, wherein the transmitter, deflection unit, reflecting units, receiver and evaluation unit are integrated into the arch-type housing and wherein the first stationary reflecting unit is located within one inner side leg and the second stationary reflecting unit is located within the other inner side leg of the arch-type housing.

2. The optoelectronic device according to claim 1, wherein the objects are sample tubes with a longitudinal axis, which are transported on a conveyor belt functioning as the conveying device, and the tubes are positioned stationary on the conveyor belt, with their longitudinal axis perpendicular to the belt.

3. The optoelectronic device according to claim 2, wherein the marking is a barcode that is affixed to the surface area of the sample tube, which barcode is aligned in longitudinal direction of the sample tube.

4. The optoelectronic device according to claim 1, wherein the deflection unit is formed by a polygonal mirror wheel arranged above the detection range, said polygonal mirror wheel having a horizontal rotational axis that extends in the direction of the longitudinal axis of the conveyor device and comprises several facets, which form the mirror surfaces.

5. The optoelectronic device according to claim 4, wherein each of the reflecting units comprise an arrangement of reflecting mirrors, each arrangement of reflecting mirrors being identical and arranged symmetrical to the longitudinal axis of the conveyor device.

6. The optoelectronic device according to claim 4, wherein each reflecting unit comprises a first and a second reflecting mirror, the normal vectors for the reflecting mirrors extending in one plane, perpendicular to the rotational axis of the polygonal mirror wheel, and wherein the transmitted light rays that are guided over the first and second reflecting mirrors strike the object from a side.

7. The optoelectronic device according to claim 6, wherein each reflecting unit further comprises third and fourth reflecting mirrors installed in series after the second reflecting mirror and the third and fourth reflecting mirrors are arranged symmetrical to the symmetry axis of the second reflecting mirror, which is perpendicular to the longitudinal axis of the conveyor device, and at a distance to each other, so that the first portion of the transmitted light rays are guided via the third reflecting mirror and the second portion of the transmitted light rays are guided via the fourth reflecting mirror, to arrive at the object at different angles of incidence.

8. The optoelectronic device according to claim 7, wherein the planes for the mirror surfaces of the third and fourth reflecting mirrors extend parallel to each other and perpendicular to the longitudinal axis of the conveyor device.

9. The optoelectronic device according to claim 7, wherein the distance between the third and fourth reflecting mirrors essentially corresponds to the width of the second reflecting mirror.

10. The optoelectronic device according to claim 7, wherein the polygonal mirror wheel has an alternating arrangement of two facets, inclined at different angles relative to its rotational axis, the transmitted light rays reflected at the first facets form the first portion of the transmitted light rays and the transmitted light rays reflected at the second facets form the second portion of the transmitted light rays.

11. The optoelectronic device according to claim 7, wherein the third and fourth reflecting mirrors are arranged behind an exit window, which adjoins the conveyor device on the side and is oriented perpendicular to the horizontal plane of the conveyor device.

12. The optoelectronic device according to claim 11, further comprising a reflector with a test barcode arranged on the side of at least one exit window, to which the transmitted light rays that are guided over a reflecting unit arranged on the opposite side of the conveyor device are transmitted, but only if no object is arranged inside the detecting range.

13. The optoelectronic device according to claim 12, wherein if no test barcode is detected, the evaluation for detecting the marking affixed on the object is activated in the evaluation unit.

14. The optoelectronic device according to claim 1, wherein exit windows are respectively arranged on the inside of each side leg of the housing.

* * * * *